(12) United States Patent
Baumann et al.

(10) Patent No.: US 11,250,829 B2
(45) Date of Patent: Feb. 15, 2022

(54) ROOF SHELL HAVING AN ACOUSTIC INSULATION LAYER

(71) Applicant: Webasto SE, Stockdorf (DE)

(72) Inventors: Matthias Baumann, Stockdorf (DE); Matthias Altendorfner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 167 days.

(21) Appl. No.: 16/508,716

(22) Filed: Jul. 11, 2019

(65) Prior Publication Data

US 2019/0344646 A1 Nov. 14, 2019

Related U.S. Application Data

(62) Division of application No. 15/919,293, filed on Mar. 13, 2018, now Pat. No. 10,699,687.

(30) Foreign Application Priority Data

Mar. 16, 2017 (DE) .......................... 102017105679.3

(51) Int. Cl.
*B29C 44/56* (2006.01)
*B29L 31/30* (2006.01)
(Continued)

(52) U.S. Cl.
CPC ........ *G10K 11/168* (2013.01); *B29C 44/5627* (2013.01); *B29C 44/5681* (2013.01);
(Continued)

(58) Field of Classification Search
CPC ... G10K 11/168; B60J 7/12; B60J 7/08; B60J 7/04; B60J 7/14; B60J 7/143;
(Continued)

(56) References Cited

U.S. PATENT DOCUMENTS 3,966,526 A * 6/1976 Doerfling ............ B60R 13/0225
156/224
4,211,590 A * 7/1980 Steward .................. B29C 51/14
156/79

(Continued)

FOREIGN PATENT DOCUMENTS

| DE | 3627431 C2 | 12/1995 |
| EP | 2857263 B1 | 5/2016 |
| FR | 2299964 A1 | 9/1976 |

OTHER PUBLICATIONS

Baunetz Wissen, "Polyurethan-Hartschaum (PUR)," https://www.baunetzwissen.de/daemmstoffe/fachwissen/daemmstoffe/polyurethan-hartschaum-pur-152202; n.d., English translation submitted herewith (2 pages).

*Primary Examiner* — Michael A Tolin
(74) *Attorney, Agent, or Firm* — Fitch, Even, Tabin & Flannery, LLP

(57) ABSTRACT

A motor vehicle roof shell having a rigid composite component having an inner side facing a vehicle interior, and an acoustic insulation layer disposed on the inner side of the composite component. The panel-type rigid composite component has at least one tray-like recess on its inner side, said recess being filled with an open-pored foam material which forms the acoustic insulation layer and whose surface is flush with a surface of the composite component surrounding the recess. A motor vehicle roof shell motor vehicle having a panel-type rigid composite component having an inner side, which faces the vehicle interior, and an acoustic insulation layer disposed on the inner side of the composite component, wherein the acoustic insulation layer is formed by at least one rigid-foam or semi-rigid-foam plate which is bonded to the inner side of the composite component and compressed that its volume is reduced compared to preassembly state.

4 Claims, 2 Drawing Sheets

(51) Int. Cl.
  *B32B 3/12* (2006.01)
  *B32B 5/18* (2006.01)
  *B60J 7/04* (2006.01)
  *G10K 11/168* (2006.01)
  *B60J 7/12* (2006.01)
  *B60J 7/08* (2006.01)
  *B62D 25/06* (2006.01)
  *B32B 23/00* (2006.01)
  *B32B 37/14* (2006.01)
  *B29C 65/00* (2006.01)
  B32B 38/00 (2006.01)
  E04B 1/84 (2006.01)

(52) U.S. Cl.
  CPC ...... *B29C 66/727* (2013.01); *B29C 66/72525* (2013.01); *B32B 3/12* (2013.01); *B32B 5/18* (2013.01); *B32B 23/00* (2013.01); *B32B 37/146* (2013.01); *B60J 7/04* (2013.01); *B60J 7/08* (2013.01); *B60J 7/12* (2013.01); *B62D 25/06* (2013.01); *B29L 2031/3011* (2013.01); *B32B 2038/0024* (2013.01); *B32B 2305/022* (2013.01); *B32B 2305/024* (2013.01); *B32B 2605/003* (2013.01); *E04B 1/84* (2013.01); *E04B 2001/8461* (2013.01)

(58) Field of Classification Search
  CPC ........... B62D 25/06; B32B 23/00; B32B 3/12; B32B 5/18; B32B 5/245; B32B 7/12; B32B 37/146; B32B 38/0012; B32B 2038/0024; B32B 2262/101; B32B 2266/06; B32B 2305/022; B32B 2305/024; B32B 2605/003; B32B 2605/08; E04B 1/84; E04B 2001/8461; B29C 44/5627; B29C 44/5681; B29C 66/72525; B29C 66/7254; B29C 66/727; B29L 2031/3011; B29L 2031/3055; B29L 2031/608
  USPC ........................................................ 156/245
  See application file for complete search history.

(56) References Cited

U.S. PATENT DOCUMENTS

| 6,204,209 | B1 | 3/2001 | Rozek et al. |
| 6,659,223 | B2 * | 12/2003 | Allison ................ B32B 5/18 |
| | | | 181/290 |
| 2003/0124314 | A1 * | 7/2003 | Michael ................ B32B 27/04 |
| | | | 428/156 |
| 2005/0242627 | A1 * | 11/2005 | Heholt ................ B60R 13/0225 |
| | | | 296/214 |
| 2009/0174227 | A1 | 7/2009 | Ariznavarreta Esteban et al. |

* cited by examiner

ROOF SHELL HAVING AN ACOUSTIC INSULATION LAYER

CROSS-REFERENCE TO RELATED APPLICATIONS

This application is a divisional of U.S. application Ser. No. 15/919,293, filed Mar. 13, 2018, now U.S. Pat. No. 10,699,687, which claims priority from German Patent Application Number DE 10 2017 105 679 .3, filed Mar. 16, 2017, which are hereby incorporated herein by reference in their entirety for all purposes.

FIELD

The invention relates to a roof shell of a motor vehicle, the roof shell having the features of the preamble of claim 1.

BACKGROUND

A roof shell of this kind is known from practice and can be a fixed roof of a motor vehicle or a roof segment of a retractable hard top of a convertible vehicle, the retractable hard top comprising multiple rigid roof segments. The roof shell can also be realized as what is known as a composite module which comprises a panel-type rigid composite component which is provided with an additional acoustic insulation layer at its inner side. The composite component can be of a sandwich design and comprise a core layer which is formed by a paper honeycomb or a foam material, for example, and which is provided with a glass-fiber/polyurethane mixture on both sides. Moreover, the composite component can comprise an outer skin of the vehicle roof in question, the outer skin thus matching the design of the vehicle in question. The acoustic insulation layer serves to acoustically insulate the vehicle interior from the surroundings of the vehicle. However, acoustic insulation layers used so far present the problem that seams between the acoustic insulation layer and the composite component as well as irregularities on the inner side of the composite component may become apparent on the acoustic insulation layer at the inner side of the roof shell, in particular at a headliner fabric applied thereto as a lining.

SUMMARY

The object of the invention is to provide a roof shell of the kind mentioned above that has an optimized acoustic insulation layer.

According to the invention, this object is attained by the roof shell having the features of claim 1.

Thus, a roof shell of a motor vehicle is proposed that comprises a panel-type rigid composite component having an outer side and an inner side, which faces a vehicle interior. Moreover, the roof shell comprises an acoustic insulation layer disposed on the inner side of the composite component. The composite component has at least one tray-like recess on its inner side, said recess being filled with an open-pored foam material which forms the acoustic insulation layer and whose surface is flush with the surface of the composite component surrounding the recess.

With the roof shell designed according to the invention, the edges of the composite component thus remain free of the acoustic insulation layer. The acoustic insulation layer thus does not reach the edges of the rigid composite component. This ensures that the inner side of the roof shell can be lined and the lining can have an edge fold at its edges that wraps around the edges of the composite component. Additionally, it should be made sure that the open-pored foam material that fills the tray-like recess does not shrink during setting so that there will be no height difference or gap between the surface of the composite component surrounding the recess and the foam material filling the tray-like recess. This ensures that the inner side of the roof shell can be lined properly.

In a preferred embodiment of the roof shell according to the invention, the open-pored foam material is a fine-pored flexible foam. In particular, the fine-pored flexible foam can be a polyurethane foam having a density between 50 kg/m$^3$ and 80 kg/m$^3$.

Preferably, the foam material is introduced into the tray-shaped recess according to a foaming process in a foaming mold. A foaming process of this kind can be performed in short process times, i.e. at a high cycle rate. Moreover, the mold-based process in the foaming mold allows achieving high process stability, which, in turn, has a positive effect on the expenditures required for quality control.

In the foaming process in the foaming mold, an external release agent acting as a pore opener is preferably used. This has a favorable effect on the acoustic insulation properties of the foam material.

The bottom of the tray-like recess can present irregularities or protrusions or can be rippled. This may be caused by functional elements integrated in the composite component. The foam material forming the acoustic insulation layer accommodates these irregularities, i.e. encloses them, while being smooth and even, i.e. free of protrusions or steps, at its surface. In this way, the system is independent of any influences that may be caused by changes in geometry of the composite component.

The invention also relates to a roof shell of a motor vehicle that comprises a panel-type rigid composite component having an outer side and an inner side, which faces the vehicle interior. An acoustic insulation layer disposed on the inner side of the composite component is formed by at least one rigid-foam or semi-rigid-foam plate which is bonded to the inner side of the composite component and compressed in such a manner that its volume is reduced as compared to a pre-assembly state.

By being compressed in a suitable pressing tool, the rigid-foam or semi-rigid-foam plate, which is bonded to the composite component across a large surface or to parts thereof, accommodates irregularities and surface protrusions of the composite component auf, whereas the outer side, i.e. the side of the foam material facing away from the composite component, is smooth and even, thus allowing it to be lined with a headliner, which then forms a class A surface. Thus, no additional headliner element is required.

The roof shell designed according to the invention and comprising the rigid-foam or semi-rigid-foam plate is produced by first producing the composite component in a corresponding molding tool. Subsequently, the rigid-foam or semi-rigid-foam plate is pressed onto the composite component. For bonding it to the composite component, an adhesive system, such as a spray adhesive or the like, can be used. Joining and compression preferably take place in a press.

If required, a pressing tool including component holders can be used. In particular, one tool half of the tool holds the composite component in a form-fitting manner, thus ensuring a homogenous pressure distribution during compression and avoiding damage to the composite component. A second tool half can be of such a geometric design that height differences, recesses and seams are pressed into the rigid-foam or semi-rigid-foam plate during compression. These deformations are preserved after the pressing process in the rigid-foam plate or semi-rigid-foam plate, which is reduced in volume. Accordingly, height differences, recesses and seams of the composite component due to inserts, for example, are pressed into the rigid-foam or semi-rigid-foam plate. Thus, the appearance of the roof shell on the inner side is not compromised by gaps, ripples or other defects in the composite component.

As apparent from the explanations above, the acoustic insulation layer provided by the rigid-foam or semi-rigid-foam plate is preferably bonded to the composite component through a mold-based pressing process. This process can take place at high process stability and thus with little expenditure in terms of quality control. The resulting component, which is composed of the composite component and the compressed rigid-foam or semi-rigid-foam plate, can be easily lined while offering proper acoustic insulation.

Furthermore, the roof shell comprising the compressed rigid-foam or semi-rigid-foam plate is characterized by low production costs because only little investment is required for the pressing tool as compared to foaming molds. Moreover, a rigid-foam or semi-rigid-foam plate exhibits high dimensional stability.

The rigid-foam or semi-rigid-foam plate advantageously consists of an open-pored rigid foam, which enhances the acoustic insulating properties.

Preferably, the rigid-foam or semi-rigid-foam plate has a density between 50 kg/m$^3$ and 150 kg/m$^3$ when in the compressed state.

A polyurethane-ester foam, a polyethylene foam or any other foam material suitable for the respective roof shell can be used as the material for the rigid-foam or semi-rigid-foam plate.

In a specific embodiment, the roof shell according to the invention forms a roof shell of what is known as a retractable hard top (RHT) of a convertible vehicle, the retractable hard top being composed of rigid roof shells. However, the roof shell can also be a panel bow of what is referred to as panel-bow top, which comprises a foldable top cover fabric.

The invention also relates to a method for producing of a roof shell of a motor vehicle. In this method, the following steps are performed:
  producing a panel-type composite element in a molding tool;
  placing the panel-type composite element in a pressing tool;
  placing a rigid-foam or semi-rigid-foam plate in the pressing tool;
  compressing the rigid-foam or semi-rigid-foam plate with the composite component so that the volume of the rigid-foam or semi-rigid-foam plate is reduced and the latter forms an acoustic insulation layer of the roof shell.

Other advantages and advantageous embodiments of the subject-matter of the invention are apparent from the description, the drawing and the claims.

Exemplary embodiments of a roof shell according to the invention are illustrated in a schematically simplified manner in the drawing and are explained in more detail in the following description.

BRIEF DESCRIPTIONS OF THE DRAWINGS

DETAILED DESCRIPTION

Figure 1:
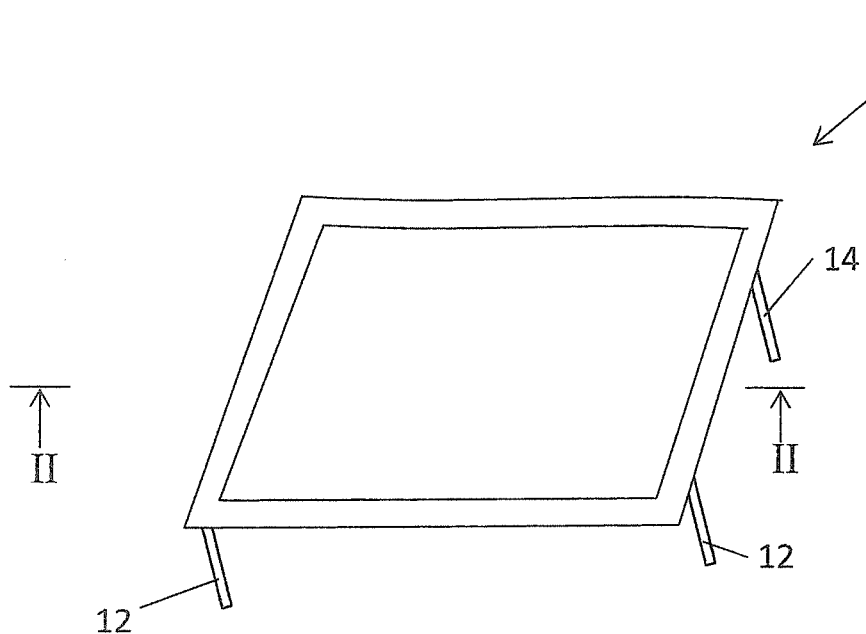
FIG. 1 shows a perspective top view of a roof shell of a top of a convertible vehicle.
Figure 2:
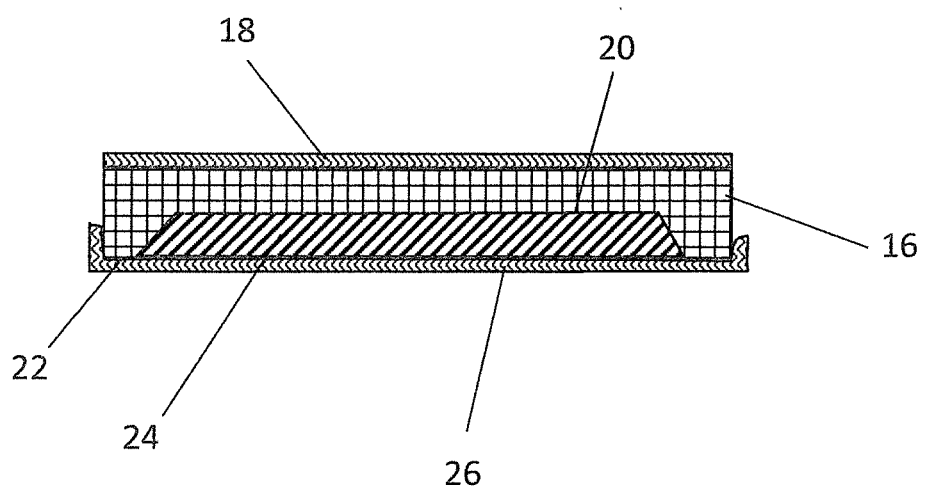
FIG. 2 shows a section through the roof shell of FIG. 1 along line II-II in FIG. 1.

FIGS. 1 and 2 illustrate a roof shell 10 that is a rigid roof segment of a multi-shell retractable hard top of a convertible vehicle. The roof shell 10 is connected to two links 12 and 14 on either side of a vertical longitudinal center plane of the roof so as to be connected to a top linkage of the retractable hard top.

The roof shell 10 is a composite element that comprises a composite component 16 as a base, which comprises a core made of a paper honeycomb or foam. The core is provided with a polyurethane/glass-fiber mixture on the top and on the bottom. On its outer side, i.e. on the side facing away from the vehicle interior, the composite component 16 is provided with a plastic film 18, which forms the outer skin of the roof shell 10.

On its inner side, which faces the vehicle interior, the composite component 16 has a tray-like recess 20 that is surrounded by a surface 22 of the composite component 16 in the manner of a frame. The tray-like recess is filled with an open-pored foam material, which forms an acoustic insulation layer 24. The open-pored foam material of the acoustic insulation layer 24 is a fine-pored flexible polyurethane foam having a density of about 50 kg/m$^3$ to 80 kg/m$^3$ and is introduced into the tray-like recess 20 in its form-locked state according to a foaming process in a foaming mold. As can be seen in FIG. 2, the acoustic insulation layer 24 has a top side, i.e. a side facing away from the plastic film 18, which is flush with the frame-like surface 22 of the composite component 16. This means that there is no height difference or gap at the seam between the acoustic insulation layer 24 and the surface 22.

Furthermore, the roof shell 10 has a fabric lining 26 on its inner side, said fabric lining 26 covering both the acoustic insulation layer 24 and the surface 22 of the composite component 16 and having an edge fold that wraps around the edges of the composite component 16. Since the surface of the acoustic insulation layer 24 and the surface 22 are flush, the seam between these two areas cannot become apparent on the fabric lining 26 that forms the inner visible surface of the roof shell 10. In order to achieve ideal acoustics, the surface 22 is kept as small as possible so that the surface of the acoustic insulation layer 24 is as large as possible.

Figure 3A:
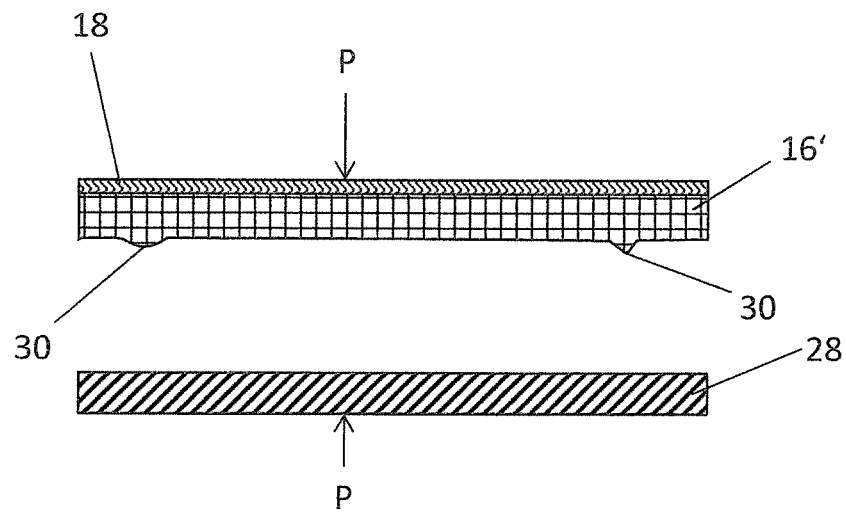
FIG. 3a shows a second embodiment of a roof shell according to the invention prior to the joining of a composite component and an acoustic insulation layer.
Figure 3B:
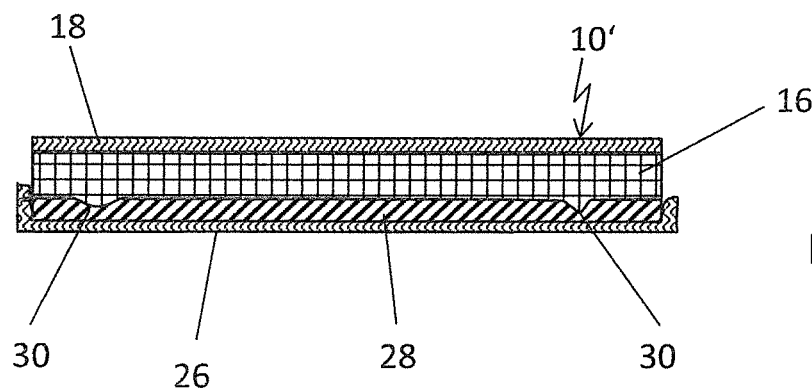
FIG. 3b shows the roof shell of FIG. 3a in the finished state.

FIGS. 3a and 3b show an alternative embodiment of a roof shell 10' of what is known as a retractable hard top of a convertible vehicle. The roof shell 10', too, has a composite component 16' as a base, which comprises a core made of a paper honeycomb coated with a polyurethane/glass-fiber mixture on both sides. At its outer side, the composite component 16' has a plastic film 18, which forms the outer skin of the roof shell 10', which faces the surroundings of the vehicle.

At its inner side, the composite component 16 is provided with an acoustic insulation layer 28 which is made of a rigid polyurethane-ester foam or of a semi-rigid polyethylene foam and to which the composite component 16 is glued and additionally pressed, as can be seen in FIG. 3b, in such a manner that its volume is reduced as compared to the pre-assembly state, which is illustrated in FIG. 3a. The rigid foam or semi-rigid foam of the acoustic insulation layer 28 is open-pored and has a density between 50 kg/m³ and 150 kg/m³ when in the compressed state, which is illustrated in FIG. 3*b*.

For production, the composite component 16' is placed in a mold half of a pressing tool. The uncompressed acoustic insulation layer 28 is placed in the other mold half. Additionally, the exposed side facing the acoustic insulation layer 28 is provided with an adhesive, such as a spray adhesive. Then, the pressing tool is closed in the direction of the arrows P in FIG. 3*a*, the two tool halves thus being moved against each other and the acoustic insulation layer 28 being pressed against the inner side of the composite component 16' and bonded thereto via the adhesive layer. The volume of the acoustic insulation layer 28 is reduced in the process, as can be seen by comparing FIGS. 3*a* and 3*b*, which means that its in thickness decreases. Additionally, any irregularities or differences 30 in thickness of the composite component 16 are accommodated by the acoustic insulation layer 28 because they are pressed into the rigid-foam and semi-rigid-foam material. The side of the acoustic insulation layer 28 facing the vehicle interior remains smooth.

In a final step, the component provided with the acoustic insulation layer 28 is provided with a fabric lining 26 that wraps around the edges of the acoustic insulation layer 28 with an edge fold.

REFERENCE SIGNS

10 roof shell
12 link
14 link
16 composite component
18 plastic film
20 recess
22 surface
24 acoustic insulation layer
26 fabric lining
28 acoustic insulation layer

The invention claimed is:
1. A method for producing a roof shell of a motor vehicle, comprising the following steps:
   producing a composite panel component in a molding tool, wherein the composite panel component comprises a plastic film which forms an outer skin of the roof shell and a core made of a paper honeycomb having two opposed sides and a polyurethane/glass-fiber mixture coated on both sides of the paper honeycomb;
   placing the composite panel component in a first mold half of a pressing tool;
   placing a foam plate in a second mold half of the pressing tool, wherein the foam plate comprises a rigid foam material or a semi-rigid foam material; and
   compressing the foam plate with the composite panel component so that:
   a volume of the foam plate is reduced and the composite panel component forms an acoustic insulation layer of the roof shell, and
   any irregularities or differences in thickness of the composite panel component are pressed into the foam material of the foam plate so that they are accommodated by the foam plate as they are pressed into the foam material of the foam plate,
   wherein a side of the foam plate configured to face a vehicle interior is smooth after compression.
2. The method according to claim 1, further comprising: providing the foam plate and/or the composite panel component with an adhesive prior to compression.
3. The method according to claim 1, further comprising: lining the acoustic insulation layer with a headliner fabric or flock.
4. The method according to claim 1, further comprising: lining the acoustic insulation layer with a headliner fabric, wherein lining includes wrapping the headliner fabric around edges of the acoustic insulation layer with an edge fold.

* * * * *